(12) United States Patent
Wikström et al.

(10) Patent No.: US 10,694,575 B2
(45) Date of Patent: Jun. 23, 2020

(54) WIRELESS COMMUNICATIONS

(71) Applicant: Telefonaktiebolaget LM Ericsson (publ), Stockholm (SE)

(72) Inventors: Gustav Wikström, Täby (SE); Niklas Andgart, Södra Sandby (SE); Henrik Enbuske, Stockholm (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 16/088,544

(22) PCT Filed: Mar. 28, 2017

(86) PCT No.: PCT/EP2017/057317
§ 371 (c)(1),
(2) Date: Sep. 26, 2018

(87) PCT Pub. No.: WO2017/167755
PCT Pub. Date: Oct. 5, 2017

(65) Prior Publication Data
US 2019/0110332 A1    Apr. 11, 2019

Related U.S. Application Data

(60) Provisional application No. 62/316,686, filed on Apr. 1, 2016.

(51) Int. Cl.
*H04W 72/04* (2009.01)
*H04W 76/28* (2018.01)
(Continued)

(52) U.S. Cl.
CPC ....... *H04W 76/28* (2018.02); *H04W 52/0229* (2013.01); *H04W 72/042* (2013.01);
(Continued)

(58) Field of Classification Search
CPC .......... H04W 72/042; H04W 72/0446; H04W 51/0229; H04W 76/28
See application file for complete search history.

(56) References Cited

U.S. PATENT DOCUMENTS

| | | | |
|---|---|---|---|
| 2012/0275364 A1 | 11/2012 | Andersson et al. | |
| 2015/0359035 A1* | 12/2015 | Lee | H04W 52/0235 370/311 |
| 2017/0163388 A1* | 6/2017 | Wiemann | H04L 1/1861 |
| 2018/0123769 A1* | 5/2018 | Pelletier | H04L 5/001 |

OTHER PUBLICATIONS

3rd Generation Partnership Project, "3rd Generation Partnership Project; Technical Specification Group Radio Access Network; Evolved Universal Terrestrial Radio Access (E-UTRA); Physical channels and modulation (Release 13)", Technical Specification, 3GPP TS 36.211 V13.1.0, Mar. 1, 2016, pp. 1-155, 3GPP, France.
(Continued)

*Primary Examiner* — Wei Zhao
(74) *Attorney, Agent, or Firm* — Coats + Bennett, PLLC

(57) ABSTRACT

A method may be provided to operate a user equipment device, UE. The method may comprise, when operating with a short Transmission Time Interval (sTTI), and when using connected mode discontinuous reception, DRX, monitoring transmissions from a radio access network node during a first part of a subframe for a UE-specific message for the UE containing first control information. If no UE-specific message for the UE containing first control information is received, the UE may be inactive during a second part of the subframe following after the first part of the subframe. If the UE receives the UE-specific message containing first control information, it may monitor the second part of the subframe for a message containing second control information, for use in receiving or transmitting data from or to the radio access network node.

25 Claims, 9 Drawing Sheets

(51) Int. Cl.
*H04W 52/02* (2009.01)
*H04W 88/02* (2009.01)

(52) U.S. Cl.
CPC ........ *H04W 72/0446* (2013.01); *H04W 88/02* (2013.01); *Y02D 70/00* (2018.01); *Y02D 70/1262* (2018.01); *Y02D 70/146* (2018.01); *Y02D 70/21* (2018.01); *Y02D 70/24* (2018.01)

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Study on latency reduction techniques for LTE (Release 13)", Technical Report, 3GPP TR 36.881 V0.6.0, Feb. 1, 2016, pp. 1-92, 3GPP, XP051081220.
Ericsson, "Impact of sTTI on MAC timers and DRX'", 3GPP TSG-RAN WG2#97, Athens, Greece, Feb. 13, 2017, pp. 1-7, Tdoc R2-1701608, 3GPP, XP051223066.
Huawei et al., "DCI design for short TTI", 3GPP TSF RAN WG1 Meeting #84bis, Busan, Korea, Apr. 11, 2016, pp. 1-11, R1-162588, 3GPP, XP051080276.
Ericsson, "Definition of DCI bit fields for short TTI", 3GPP TSG RAN WG1 Meeting #84bis, Busan, Korea, Apr. 11, 2016, pp. 1-5, R1-163323, 3GPP, XP051079813.

\* cited by examiner

WIRELESS COMMUNICATIONS

TECHNICAL FIELD

This relates to data transmission between a radio access network node and a user equipment device.

BACKGROUND

One metric that is used to analyse the performance of wireless communications networks is the packet data latency, namely the time taken for data to cross the network. Lower packet data latency improves the perceived responsiveness of the system, and the throughput of the system. In the case of a wireless communications network, latency reductions can also improve radio resource efficiency.

In the case of wireless communications using the Long Term Evolution (LTE) protocols, the packet data latency can be improved by reducing the transport time for data and control signalling.

The use of discontinuous reception (DRX) allows a power saving by a user equipment by moving into an inactive or sleep state. Providing for an increase in the time a user equipment is in sleep mode allows a reduction in power consumption.

SUMMARY

According to a first aspect of the invention, there is provided a method of operation of a user equipment device, UE. The method comprises: when operating with a short Transmission Time Interval (sTTI), and when using connected mode discontinuous reception, DRX, monitoring transmissions from a radio access network node during a first part of a subframe for a UE-specific message for the UE containing first control information. If no UE-specific message for the UE containing first control information is received, being inactive during a second part of the subframe following after the first part of the subframe; and if the UE receives the UE-specific message containing first control information: monitoring the second part of the subframe for a message containing second control information, for use in receiving or transmitting data from or to the radio access network node.

Optionally, the first control information defines a frequency resource available for data communication with the radio access network node over a subframe.

Optionally, the message containing first control information comprises a slow grant message or slow downlink control information, DCI, message.

Optionally, the second control information defines a time resource for a sub-subframe of the subframe.

Optionally, the message containing second control information comprises a fast grant message or fast DCI message.

Optionally, the first part of the subframe comprises a Physical Downlink Control Channel, PDCCH.

Optionally, the second part of the subframe comprises a downlink sTTI band, which is defined in the first control information.

Optionally, the downlink sTTI band comprises a subset of available subcarriers during symbols subsequent to the PDCCH.

There is also provided a user equipment device, configured to perform a method according to the first aspect.

There is also provided a user equipment for wireless communication with a network node, the user equipment comprising: a transceiver circuit configured to send and receive wireless signals; and a processing circuit operatively connected to the transceiver circuit and configured to carry out a method comprising: when operating with a short Transmission Time Interval, sTTI, and when using connected mode discontinuous reception, DRX, monitoring transmissions from a radio access network node during a first part of a subframe for a UE-specific message for the UE containing first control information. If no UE-specific message for the UE containing first control information is received, being inactive during a second part of the subframe following after the first part of the subframe; and if the UE receives the UE-specific message containing first control information: monitoring the second part of the subframe for a message containing second control information, for use in receiving or transmitting data from or to the radio access network node.

The processing circuit may be configured to carry out any method according to the first aspect.

There is also provided a computer program product, comprising computer-readable code, configured to cause a suitably programmed processor to perform a method according to the first aspect.

There is also provided a user equipment for wireless communication with a network node, the user equipment comprising:
  a first monitoring module for, when operating with a short Transmission Time Interval (sTTI), and when using connected mode discontinuous reception, DRX, monitoring transmissions from a radio access network node during a first part of a subframe for a UE-specific message for the UE containing first control information. The user equipment further comprises an inactivation module configured to, if no UE-specific message for the UE containing first control information is received, cause the UE to be inactive or in a sleep state during a second part of the subframe following after the first part of the subframe; and
  a second monitoring module configured to, if the UE receives the UE-specific message containing first control information, monitor the second part of the subframe for a message containing second control information, for use in receiving or transmitting data from or to the radio access network node.

The first control information may define a frequency resource available for data communication with the radio access network node over a subframe, and/or the second control information may define a time resource for a sub-subframe of the subframe.

The message containing first control information may comprise a slow grant message or slow downlink control information, DCI, message, and/or the message containing second control information may comprise a fast grant message or fast DCI message. The first part of the subframe may comprise a Physical Downlink Control Channel, PDCCH, and/or the second part of the subframe may comprise a downlink sTTI band, which is defined in the first control information.

According to a second aspect of the invention, there is provided a method of operation of a radio access network node. The method comprises: when operating with a short Transmission Time Interval (sTTI), transmitting to a user equipment device, UE, that is using connected mode discontinuous reception, a UE-specific message for the UE containing first control information during a first part of a subframe; and transmitting to said UE a message containing second control information, for use in receiving or transmitting data from or to the radio access network node.

Optionally, the method further comprises transmitting the UE-specific message containing first control information only if the radio access network node also has second control information to transmit to said UE.

Optionally, the first control information defines a frequency resource available for data communication with the radio access network node over a subframe.

Optionally, the message containing first control information comprises a slow grant message or slow downlink control information, DCI, message.

Optionally, the second control information defines a time resource for a sub-subframe of the subframe.

Optionally, the message containing second control information comprises a fast grant message or fast DCI message.

Optionally, the first part of the subframe comprises a Physical Downlink Control Channel, PDCCH.

Optionally, the second part of the subframe comprises a downlink sTTI band, which is defined in the first control information, and wherein the downlink sTTI band comprises a subset of available subcarriers during symbols subsequent to the PDCCH.

There is also provided a radio access network node, configured to perform a method according to the second aspect.

There is also provided a radio access network node, the radio access network node comprising: a transceiver circuit configured to send and receive wireless signals; and a processing circuit operatively connected to the transceiver circuit and configured to carry out a method comprising:

when operating with a short Transmission Time Interval (sTTI), transmitting to a user equipment device, UE, that is using connected mode discontinuous reception, a UE-specific message for the UE containing first control information during a first part of a subframe. The method further comprises transmitting to said UE a message containing second control information, for use in receiving or transmitting data from or to the radio access network node.

The processing circuit may be configured to carry out any method according to the second aspect.

A radio access network node, comprising:

a first transmission module configured, when operating with a short Transmission Time Interval (sTTI), to transmit to a user equipment device, UE, that is using connected mode discontinuous reception, a UE-specific message for the UE containing first control information during a first part of a subframe; and a second transmission module configured to transmit to said UE a message containing second control information, for use in receiving or transmitting data from or to the radio access network node.

The first transmission module may be configured for transmitting the UE-specific message containing first control information only if the radio access network node also has second control information to transmit to said UE.

The first control information may define a frequency resource available for data communication with the radio access network node over a subframe, and/or the second control information may define a time resource for a sub-subframe of the subframe.

The message containing first control information may comprise a slow grant message or slow downlink control information, DCI, message, and/or the message containing second control information may comprise a fast grant message or fast DCI message.

The first part of the subframe may comprise a Physical Downlink Control Channel, PDCCH, and/or the second part of the subframe may comprise a downlink sTTI band, which is defined in the first control information, wherein the downlink sTTI band comprises a subset of available subcarriers during symbols subsequent to the PDCCH.

There is also provided a computer program product, comprising computer-readable code, configured to cause a suitably programmed processor to perform a method according to the second aspect.

Further examples of the disclosure are described in the embodiments, statements and examples below.

DETAILED DESCRIPTION

Figure 1:
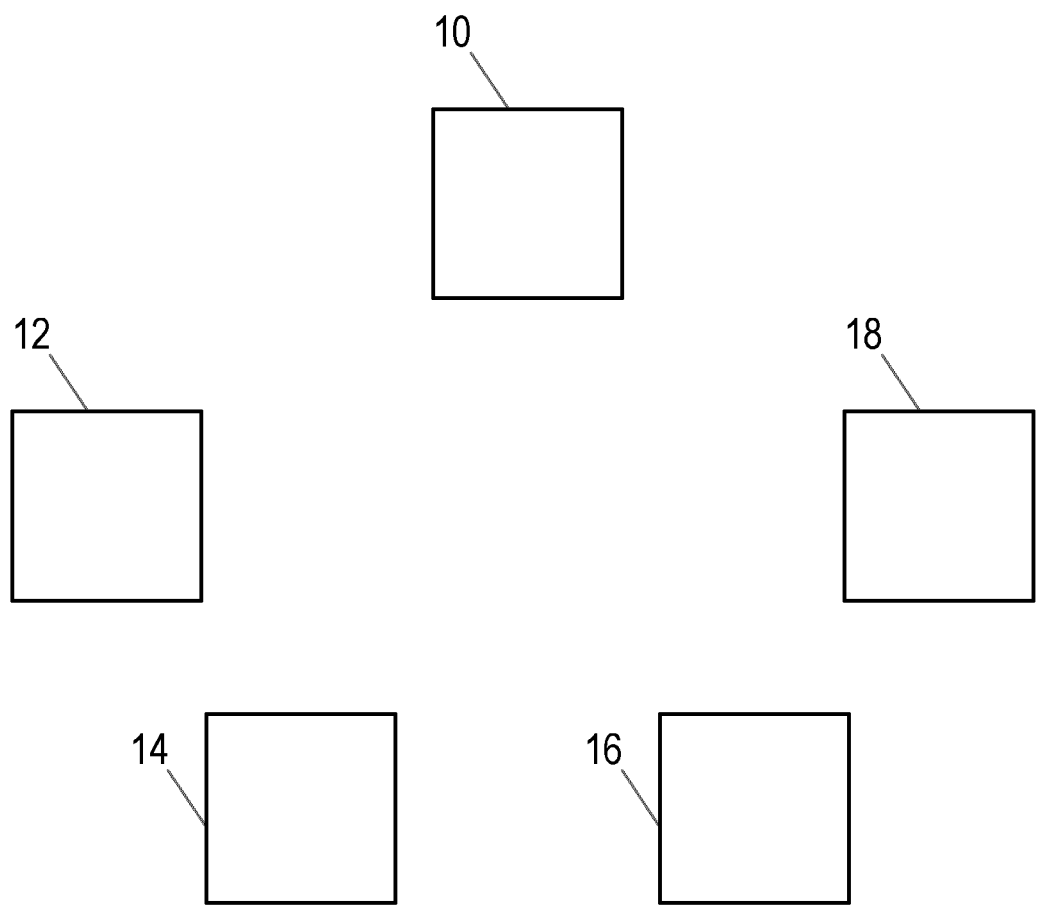
FIG. 1 shows a part of a communications network according to an embodiment.

FIG. 1 illustrates a part of a communications network, which may for example be operating in accordance with the Long Term Evolution (LTE) or other protocols. Specifically, FIG. 1 shows a radio access node 10, which may for example be an eNodeB as defined in the LTE protocols. Actions that are described herein as being taken in the radio access node 10 may be performed in the radio access node 10 itself, or may be performed partly or wholly in a remote computing resource, such as a server in the "cloud". The radio access node 10 may be a base station, or a part of a base station, as part of a radio access network. In some examples, the radio access node 10 may be termed an eNodeB (eNB). The radio access node 10 may alternatively be termed a radio access network node.

FIG. 1 also shows several user equipment devices (UEs) 12, 14, 16, 18. The UEs 12, 14, 16, 18 may be user device such as smartphones or the like or they may equally be autonomous terminal devices such as sensors or tracking devices, and may be mobile or intended for use in a fixed location. The UEs are configured to be in radio communication with the radio access node 10. The UE may alternatively be termed a User Equipment, wireless device, mobile phone or wireless terminal.

Figure 2:
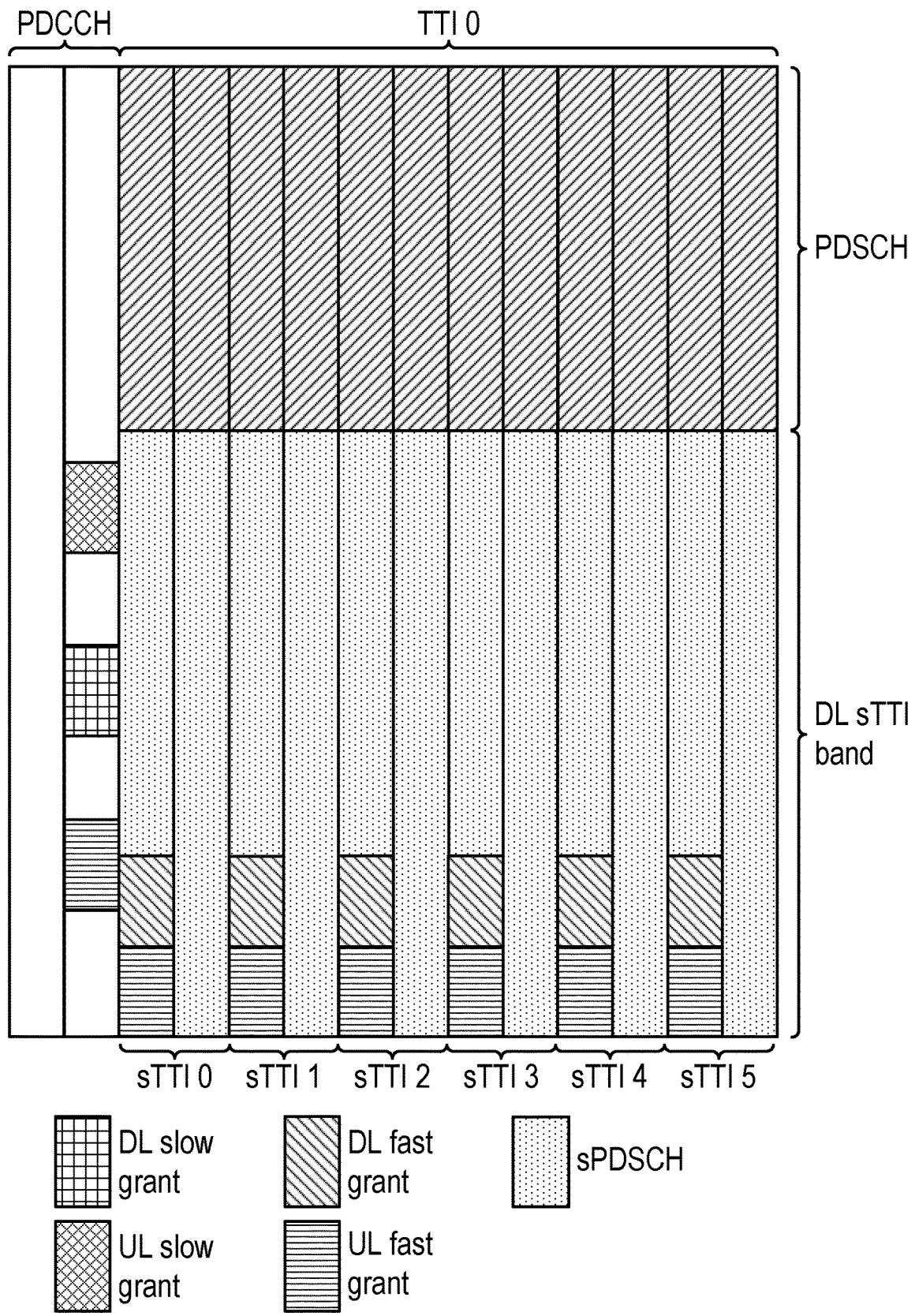
FIG. 2 shows a network resource allocation, according to an embodiment.

FIG. 2 illustrates a form of a downlink subframe in one embodiment. In the example of LTE, a subframe has a duration of 1 millisecond, and consists of 14 Orthogonal frequency-division multiplexing (OFDM) or Single-carrier frequency-division multiple access (SC-FDMA) symbols in the case of normal cyclic prefix and 12 OFDM or SC-FDMA symbols in the case of extended cyclic prefix. FIG. 2 shows an embodiment, with 14 symbols in the subframe, shown horizontally from left to right. The subframe consists of multiple frequency subcarriers, arranged on the vertical axis.

In this illustrated embodiment, a transmission time interval (TTI), is shorter than the subframe. Specifically, in this illustrated embodiment, the transmission time interval (TTI) is a short TTI (sTTI). The short TTI may be considered as a transmission time interval having a length which is less than a subframe, or having a length which is less than a slot, or may be considered as providing for transmission to/from more than one UE within a subframe and on the same frequency. This contrasts with a legacy LTE TTI which has a length of 1 ms or one subframe. In this example, the sTTI consists of two OFDM or SC-FDMA symbols. In other embodiments, downlink short TTIs may be of any desired length, such as 1, 2, 4, or 7 OFDM symbols. The short TTI length provide for more than one short TTI to be scheduled in a subframe. This provides for a same or different UEs to be scheduled within a same subframe. The UE is able to decode the received data after the short TTI, and is able to more quickly communicate with the base station.

FIG. 2 shows that, in this embodiment, the subframe includes two symbol periods that are used to provide a Physical Downlink Control Channel (PDCCH). The subframe further comprises six short TTIs, indicated by sTTI0, sTTI1, sTTI2, sTTI3, sTTI4, sTTI5, which are also each of duration two symbol periods. However, it is expected that there will exist UEs that are not able to operate with short TTIs, and thus the whole of this twelve symbol period will act as a single transmission time interval (TTI), indicated as TTI0, for such UEs. There is one instance of the PDCCH per subframe. Thus, there are multiple short TTIs, each having a data resource, associated with each PDCCH.

FIG. 2 also shows that a part of the subframe (i.e. a subset of the subcarriers) is reserved for use as a Physical Downlink Shared Channel (PDSCH), e.g. for legacy UE use. Another part of the subframe (i.e. a different subset of the subcarriers) is defined as a downlink short TTI band, or DL sTTI band. Thus, as shown in FIG. 2, the sTTI DL band consists of a part of the available frequency resources during a part of the subframe which follows the PDCCH in a subframe. The DL sTTI band contains a short TTI Physical Downlink Shared Channel (sPDSCH) and a short TTI Physical Downlink Control Channel (sPDCCH).

Figure 3:
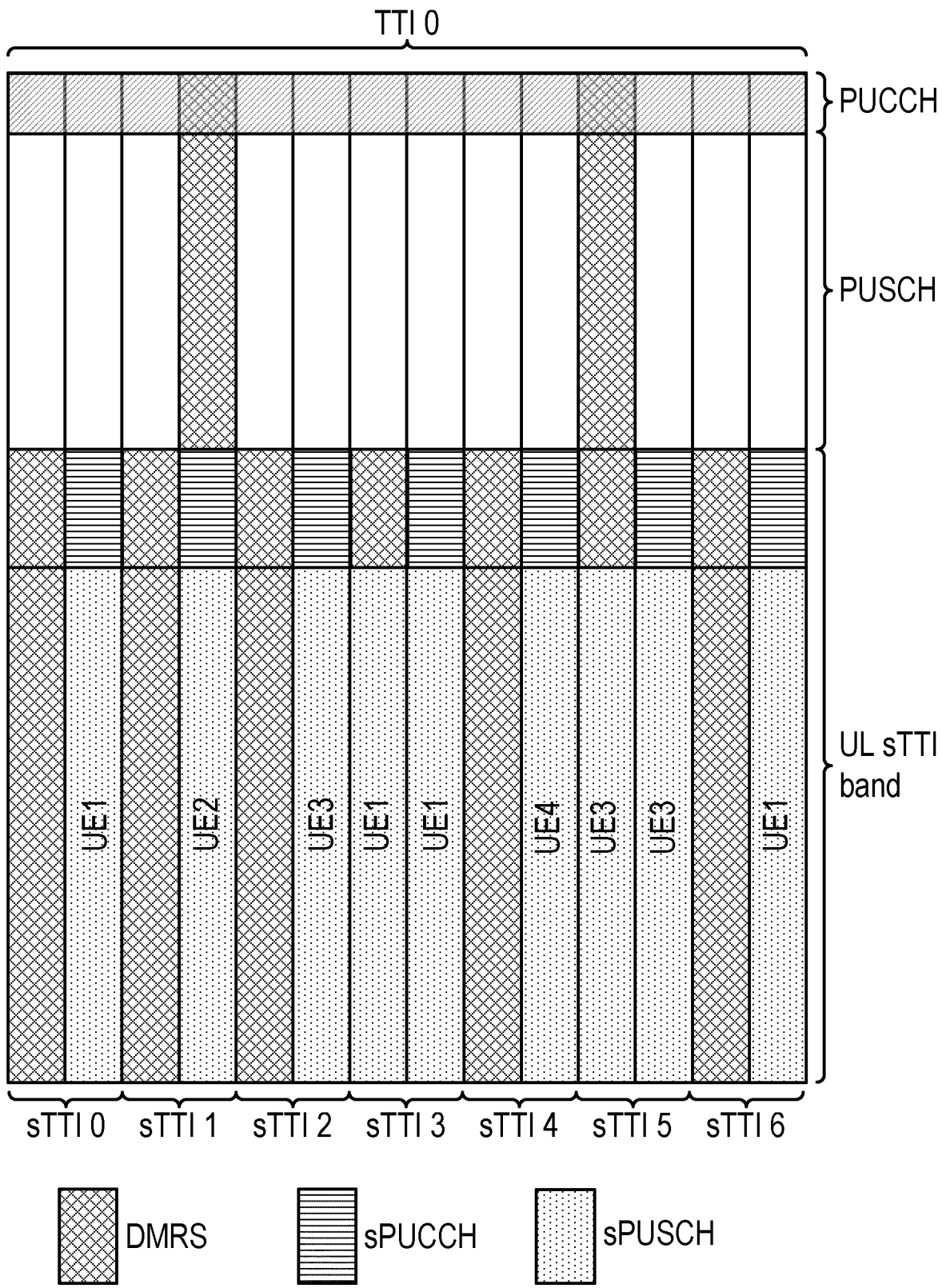
FIG. 3 shows a network resource allocation, according to an embodiment.

FIG. 3 illustrates a form of an uplink subframe in one embodiment. Specifically, in LTE, a subframe has a duration of 1 millisecond, and consists of 14 Orthogonal frequency-division multiplexing (OFDM) or Single-carrier frequency-division multiple access (SC-FDMA) symbols in the case of normal cyclic prefix and 12 OFDM or SC-FDMA symbols in the case of extended cyclic prefix. FIG. 3 shows an embodiment, with 14 symbols in the subframe, shown horizontally. The subframe consists of multiple frequency subcarriers, shown vertically.

In this illustrated embodiment, the transmission time interval (TTI), is shorter than the subframe. Specifically, in this illustrated embodiment, the transmission time interval (TTI) is a short TTI (sTTI), consisting of two OFDM or SC-FDMA symbols. In other embodiments, downlink short TTIs may be of any desired length, such as 1, 2, 4, or 7 OFDM symbols. The short TTI length provide for more than one short TTI to be scheduled in a subframe. This provides for a same or different UEs to be scheduled within a same subframe. The UE is able to complete transmission of data after the short TTI, and so is able to more quickly communicate with the base station.

Thus, FIG. 3 shows that, in this embodiment, the subframe includes seven short TTIs, indicated by sTTI0, sTTI1, sTTI2, sTTI3, sTTI4, sTTI5, sTTI6, which are each of duration two symbol periods. However, it is expected that there will exist UEs that are not able to operate with short TTIs, and thus the whole of this fourteen symbol period will act as a single transmission time interval (TTI), indicated as TTI0, for such UEs.

FIG. 3 also shows that a first part of the subframe (i.e. a first subset of the subcarriers) is defined as a Physical Uplink Control Channel (PUCCH), a second part of the subframe (i.e. a second subset of the subcarriers) is defined as a Physical Uplink Shared Channel (PUSCH), and a third part of the subframe (i.e. a third different subset of the subcarriers) is defined as an uplink short TTI band, or UL sTTI band. The UL sTTI band contains a short TTI Physical Uplink Shared Channel (sPUSCH) and a short TTI Physical Uplink Control Channel (sPUCCH). The multiple short TTIs within the subframe may be allocated to different UEs (e.g. UE1, UE2, UE3, UE4). Alternatively or in addition, a same UE may be scheduled multiple with multiple short TTIs within a subframe (e.g. UE1 in sTTI0, sTTI3 and sTTI6). This is applicable to both uplink and downlink scheduling.

Further, some resource elements are reserved for sending Demodulation reference signals (DMRS).

As mentioned above, it is expected that some UEs will be able to operate with short TTIs, while other UEs will not be able to operate with short TTIs. UEs that are able to operate with short TTIs may be configured with a group identifier, for example a Radio Network Temporary Identifier (RNTI), namely sTTI-RNTI. An alternative to this example is described below.

In one possible mode of operation, the radio access node, for example the eNB, transmits slow sTTI grants (which are messages containing control information, i.e. first control information, or Downlink Control Information (DCI) messages) with a group sTTI-RNTI in PDCCH. These slow grants, one for the uplink (UL) and one for the downlink (DL), define the extent of the DL sTTI band as shown in FIG. 2, and the UL sTTI band as shown in FIG. 3, respectively. The slow grants can also contain information about one or more of: the TTI length, short PUCCH resource, and other control information. The slow DL grant is valid in the same subframe, whereas the slow UL grant is typically valid in at least the next subframe. In this example, the slow grant is transmitted by the base station such that a plurality (e.g. all) sTTI UEs recognise and use the information in the slow grant. For example, the slow grant is identified by the sTTI-RNTI. In that case, the slow grant is not considered as UE specific. Aspects of this example may not relate to an embodiment of the disclosure, and an alternative embodiment providing for reduced UE monitoring (and hence power consumption) is described below.

In the sTTI DL band, the radio access network node (e.g. the eNB) may then insert fast sTTI grants (which are also messages containing control information, or DCI messages) for UL and DL. These grants are sent in a region of the sTTI DL band called the sPDCCH search space, or sPDCCH, as shown in FIG. 2, which may vary in location and periodicity depending on the TTI length. The fast sTTI grants are sent with a UE specific identifier, arranged such that a UE can identify a grant particular to itself. For example, the fast STTI grant is transmitted using a Cell Radio Network Temporary Identifier (C-RNTI). The fast sTTI grants are transmitted within a corresponding short TTI. A UE that reads the slow DL grant will look for fast grants in the sTTI DL band during the entire subframe.

In some examples, the slow sTTI grants may be termed first control information. The fast sTTI grants may be termed second control information. The base station transmits, and the UE receives, both the first and second control information to schedule grants on the short TTI data allocation (e.g. sPDCCH). As such, the control information is split into separate messages transmitted at different times in a subframe. The first control information is in a common control channel (e.g. PDCCH). The second control information is transmitted in each short TTI band, i.e. in the sPDCCH. The first or second control information may alternatively be termed as grants or scheduling information.

By assigning sPDSCH resources within a sub-subframe (i.e., with shorter duration as compared to a full subframe), decoding latency may be reduced since the transmission ends earlier and take less time, even for roughly the same processing capability, assuming that the payload size is down scaled appropriately. This reduction in latency may further be used to reduce HARQ (Hybrid Automatic Repeat Request) RTT (Round Trip Time) since ACK/NACK (Acknowledge/Negative-Acknowledge) feedback can be provided earlier from a downlink transmission and UE side processing perspective.

Figure 4:
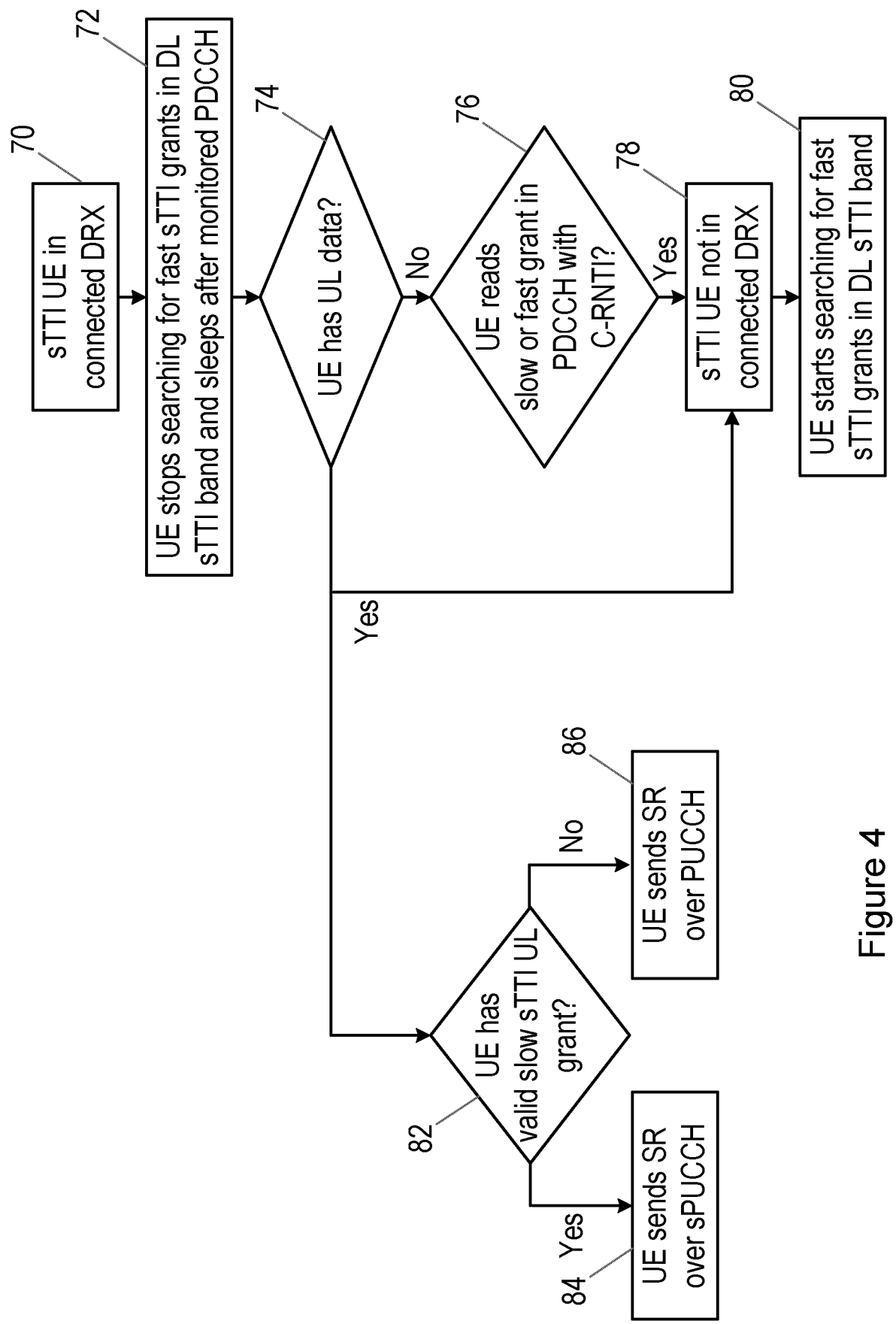
FIG. 4 is a flow chart, illustrating a method performed by a user equipment device, according to embodiments.

FIG. 4 is a flow chart, illustrating a method performed by a UE that is able to operate with short TTIs, referred to as a "sTTI UE". The process starts at step 70, with the UE using Connected mode discontinuous reception (DRX). It is known that, as a means of reducing power consumption, a UE in Connected mode, i.e. with an active connection to a radio access network node, may be moved to Connected mode DRX. This can be done automatically when a dedicated DRX timer expires, defined by the eNB over Radio Resource Control (RRC). When a UE is in connected mode DRX, the UE sleeps (in sleep state) but wakes up an active state to read the PDCCH in certain subframes according to a predefined pattern. If the UE does not find any grant in the PDCCH it goes back to DRX sleep state. The radio access network node (e.g. eNB) can also directly move the UE to Connected DRX by transmitting a DRX Command as a MAC Control Element (CE). The following steps refer to the radio access network node as being an eNB, but it will be appreciated that this is just an example, and any radio access network node can perform the relevant functionality.

As described in more detail below, downlink control information (DCI) may be partitioned into slow grants, or slow DCI (which may change, at most, once per subframe), also referred to herein as first control information, and fast grants, or fast DCI (which can vary between different sub-subframes or short TTIs), also referred to herein as second control information. If a UE decodes a fast DCI message intended for itself, the fast grant, or fast DCI, together with the slow grant, or slow DCI, may be used to determine the scheduling for the UE, e.g. a DL assignment or UL grant for the UE.

As shown in step 72 of FIG. 4, in this embodiment, a sTTI UE that goes into Connected mode DRX mode stops searching for fast sTTI grants in the sTTI DL band. This allows it to go to sleep (i.e. being inactive or entering sleep state) after reading the PDCCH in monitored subframes.

As shown in step 74, the UE determines whether it has uplink data for transmission. If it does not, the process passes to step 76.

When the eNB or other radio access node wants to awaken a sTTI UE that is in Connected mode DRX, either because it has downlink data or control information to transmit to that UE, it should inform the UE to start looking for fast sTTI grants again. This can be done in a subframe monitored by the UE by transmitting a slow sTTI DL grant with UE-specific identifier, e.g. a UE specific RNTI (C-RNTI). This differs from the previously known procedure, in which the eNB transmits a slow sTTI DL grant with sTTI-RNTI, which can be read by all sTTI UEs. Specifically, in one embodiment, the eNB scrambles the Cyclic Redundancy Check (CRC) of the slow DL Downlink Control Information (DCI), or slow grant, with the UE-specific Cell Radio Network Temporary Identifier (C-RNTI), when it wants the UE in Connected mode DRX to wake up. Thus, the slow grant, i.e. first control information, is transmitted as a UE specific message. A particular UE recognises that the first control information is for itself only, e.g. due to the use of the C-RNTI. Frequency resources used by the sPDSCH downlink sub-subframes (short TTI) may be considered slow control information (e.g., slow DCI) and may be signaled once per 1 ms using PDCCH to a particular UEs (e.g. having a UE-specific RNTI, e.g. an individual C-RNTI). Thus, the UE-specific first control information message triggers the UE to monitor a remainder of the subframe, e.g. by exiting DRX.

Thus, in step 76, the UE monitors the PDCCH, looking for UE-specific grants, descrambling the CRC with the UE-specific C-RNTI. If the UE does not detect a UE-specific grant while monitoring the PDCCH, the process returns to step 74, as the UE does not then need to search the sPDCCHf or a fast grant, and can enter DRX sleep state again (i.e. power down at least some circuitry). Thus, a UE according to an example may power down radio and/or processing circuitry during a remainder of the subframe (e.g. not monitor the following PDSCH), when the UE does not detect a slow grant (e.g. in the PDCCH) which is specific to that UE. This is in contrast to a prior art sTTI UE, which is required to monitor the remainder of a subframe (e.g. the following PDSCH), for a possible fast grant when a generic sTTI grant is detected. Thus, the prior art sTTI UE is required to monitor the remainder of the subframe, even when there is no fast grant specific to that UE included. Examples of the present disclosure therefore provide for an energy saving to the UE compared to a prior art UE.

In one embodiment, the eNB sends a UE-specific slow grant, and this is read by the UE in step 76. A slow grant is a message containing Downlink Control Information that, for example, indicates the extent of the DL sTTI band as shown in FIG. 2, and a UL sTTI band, respectively. The slow grant can also contain information about the TTI length, short Physical Uplink Control Channel (sPUCCH) resource, and other control information. The slow grant is a message containing first control information, wherein the first control information defines a frequency resource available for data communication between the radio access network node and the wireless terminal (that is, the UE) over a subframe. The slow grant message is typically sent once per subframe, e.g. in a first part of the subframe, e.g. in the PDCCH.

In the event that a UE monitors a UE specific first control information for the UE itself, in step 78, the UE is arranged to monitor a remainder, e.g. a second part, of the subframe. The UE may be considered as coming out of Connected mode DRX mode. The UE is then in Connected mode (e.g. exits DRX) or alternatively extends an active state in DRX, and monitors the entire subframe.

In step 80, the UE starts searching for fast grants, or messages containing second control information, in the sPDCCH of the DL sTTI band. The second control information may define a time resource for a part of a subframe, or a sub-subframe. A fast grant, or message containing second control information, is a UE-specific message which may, for example, also contain data identifying the Modulation and coding scheme (MCS), the Redundancy version (RV) and the New data indicator (NDI). The fast grant message may also contain HARQ process indication and precoding and layer information. The choice of the TTI length (from the possible values) needs to be indicated. If DMRS is used, the fast grant may contain an indication whether the sTTI contains DMRS or not, for the UE to map the DL data. In addition, if a sPUCCH is used a power control field may be required.

When the UE has received a slow grant (that is, a message containing first control information defining a frequency resource available for data communication between the UE and radio access network node during a subframe) and a fast grant (that is, a message containing second control information defining a time resource for a sub-subframe of the subframe), it is able to determine its resource allocation.

At this point, the UE is no longer in DRX mode, and continues to read slow grants in the PDCCH that are scrambled with the non-UE-specific identifier, e.g. sTTI-RNTI, and to look for fast sTTI grants in PDSCH.

Thus, the eNB scrambles the CRC of the slow DL DCI with the UE-specific RNTI (the C-RNTI), when it wants the UE in Connected mode DRX to wake up and start monitoring DL fast grants in the current sub-frame.

The radio access network node performs the same procedure, of using a UE specific identifier for control information in the PDCCH of the subframe (e.g. scrambling the CRC of the slow DL DCI with the UE-specific RNTI (e.g. C-RNTI)), when the radio access network node wants the UE in Connected mode DRX to wake up and start monitoring UL slow grants in the current sub-frame
UL fast grants in the next sub-frame Here, when the UE is searching for slow grants with a common DCI, the UE attempts to descramble the CRC by a sTTI-RNTI, and when the UE is searching for UE-specific fast grants, the CRC is descrambled by a UE-specific RNTI, the C-RNTI.

This slow DCI with a UE-specific RNTI can thus be used instead of a legacy DL or UL grant, for UEs supporting short TTIs.

The legacy paging consists of a UE-specific DCI on the PDCCH, followed by a paging message carried by the PDSCH within the same sub-frame as the PDCCH. A reduction in signalling overhead is thus achieved compared to the legacy paging.

In an alternative embodiment, the eNB awakens the UE by a UE-specific fast grant, scrambled with the C-RNTI, in the PDCCH. The UE then reads the slow grant in the PDCCH scrambled with sTTI-RNTI, and reads the resource allocation given by the slow and fast grants.

In yet another alternative embodiment, the eNB awakens the UE by a UE-specific extended fast grant, sent in the PDCCH, which includes the information from both the slow grant and ordinary fast grant and therefore provides all of the information for the UE to identify its resource allocation.

Thus, a sTTI-capable UE that is in Connected mode DRX is able to sleep during the PDSCH in monitored subframes, as it is not required to look for fast sTTI grants in the DL sTTI band, unless it has been woken from Connected mode DRX by the eNB sending a slow sTTI grant with the UE-specific RNTI.

If, in step 74 of the process shown in FIG. 3, the sTTI UE in Connected mode DRX determines that it has received UL data in its buffer it should wake up from DRX mode.

Thus, the process passes directly to step 78 in this case. At this point, as shown at step 80, the UE can monitor group control information (e.g. slow grant messages containing first control information scrambled with sTTI-RNTI) and can look for fast sTTI grants in the DL sTTI band again, if it did so before going to Connected mode DRX.

The wireless terminal UE monitors sPDCCH resources and attempts decoding, for example, using the relevant (UE specific) RNTI for CRC descrambling. If the base station (eNodeB) has transmitted control information (e.g., DCI) on an sPDCCH for a particular wireless terminal UE, the wireless terminal UE may detect the (second) control information through successful decoding (including descrambling based on the wireless terminal specific identification, also termed individual identification, e.g., RNTI).

In addition, if the sTTI UE in Connected mode DRX determines that it has received UL data in its buffer, it also performs step 82. If the UE monitored the PDCCH during the previous subframe, it may have a valid UL sTTI band that it can use for sending a scheduling request, and the UE makes this determination in step 82.

If in step 82 the UE determines that it has a valid slow sTTI UL grant, the process passes to step 84, and the UE transmits the scheduling request over a control channel in the short TTI band (e.g. sPUCCH, which is a part of the Uplink sTTI band, as shown in FIG. 3. Thus, the UE uses the available sPUCCH resource in subframe N if it has a valid UL sTTI band defined in the PDCCH of subframe N−1.

If in step 82 the UE determines that it has no valid sTTI UL grant until the next subframe, the process passes to step 86. Therefore the UE is unable to transmit a scheduling request over sPUCCH in this band until the following subframe when the slow UL grant is valid.

Without a valid sTTI UL band, the UE transmits the scheduling request over the legacy PUCCH, as shown in step 86. The eNB receiving the scheduling request can then assume that the UE has awaken from Connected mode DRX (e.g. exited DRX) in the same subframe N that the scheduling request was transmitted in, and that the UE has read the slow UL grant in this subframe. Therefore the eNB knows that it can transmit a fast UL grant starting from subframe N+1, either in a DL sTTI in subframe N+1 or later.

In one alternative embodiment of step 86, for the case when the UE did not have a valid UL sTTI band, the sTTI UE waking up from Connected mode DRX (e.g. exited DRX) reads the slow UL grant in subframe N and waits until the next subframe N+1, and then transmits the scheduling request over sPUCCH in the first available resource.

In this case it does not transmit the scheduling request over the legacy PUCCH in subframe N, since it knows that it will have an UL sTTI resource in subframe N+1.

As another alternative embodiment, the UE first transmits the scheduling request over the legacy PUCCH as shown in step 86, and then transmits the scheduling request again over sPUCCH in the first available resource.

When DRX is configured, the UE is not required to monitor PDCCH/sPDCCH when it is not in Active state. The UE waits until it is in its on-duration period to detect potential UL grant, e.g. as an expected result of sending a scheduling request. There may thus be a long delay before the UE wakes up from sleep mode, depending on the DRX configuration, which would increase the latency of UL transmissions. To reduce the delay, the UE could align DRX periods, that it, it could switch to DRX active time and monitor PDCCH and/or sPDCCH based on a determination that the UE has data to send (e.g. a scheduling request has been transmitted) and knows that the eNB may transmit the UL grant in subframe e.g. N+1.

Thus, a sTTI-capable UE in Connected mode DRX can go to sleep (sleep state) after reading the PDCCH, and is not required to search for fast sTTI grants. This is the case even when other sTTI are being provided with grants or control information. The sTTI UE is configured to return to Connected mode DRX sleep state when the UE determines from a monitoring of the channel comprising first control information (e.g. PDCCH) that there was no UE-specific first control information for the UE. This allows for good battery saving in Connected DRX mode for short TTI UEs. However, if the UE in Connected mode DRX receives UL data in its buffer it should start to look for fast sTTI grants again.

Reusing the slow DCI format for paging of UEs, the DCI detector for the common slow DCI format can be reused, and there is no need to specify a new DCI format, as the only difference for the UE between receiving a common slow DCI and receiving a UE-specific DCI, is the way the CRC is de-scrambled.

The use of slow DCI also entails that the network may be able to optimize, e.g. use shorter timers for a UE DRX configuration as the UE receiver only needs to be running during the slow grant transmission on PDCCH. As the UE detects a slow non-UE specific grant (e.g. using sTTI-RNTI), it may only in those cases subsequently prolong the duration of the receiver-on period at the UE, in order to detect fast grants in the DL sTTI band. By using dedicated DRX configuration, the network may facilitate a known specified overall UE behaviour at the same time as the battery efficiency overall may be increased.

There is thus described a method for allowing a UE to access resources without requiring constant monitoring of downlink signals. This provides for scheduling of a UE with a reduced power consumption.

Specifically, in one embodiment, in Connected DRX mode a UE sleeps and wakes up to monitor PDCCH in a predefined set of subframes. If a grant is not found then the UE can sleep immediately after PDCCH. However, with the use of slow and fast grants, a UE (according to a legacy example) who reads a slow DL grant will continue to search for fast grants for the duration of the subframe, and is therefore prevented from sleeping. As a solution, a sTTI UE in Connected DRX can stop searching for fast grants. The base station (e.g. eNB) can wake the UE from DRX by sending a slow grant with a UE specific address. In this way, when the eNB sends a fast grant to the UE, the UE will wake up and find the fast grant. Thus, in Connected DRX the UE does not search for fast grants (unless they are signalled to be present).

Figure 5:
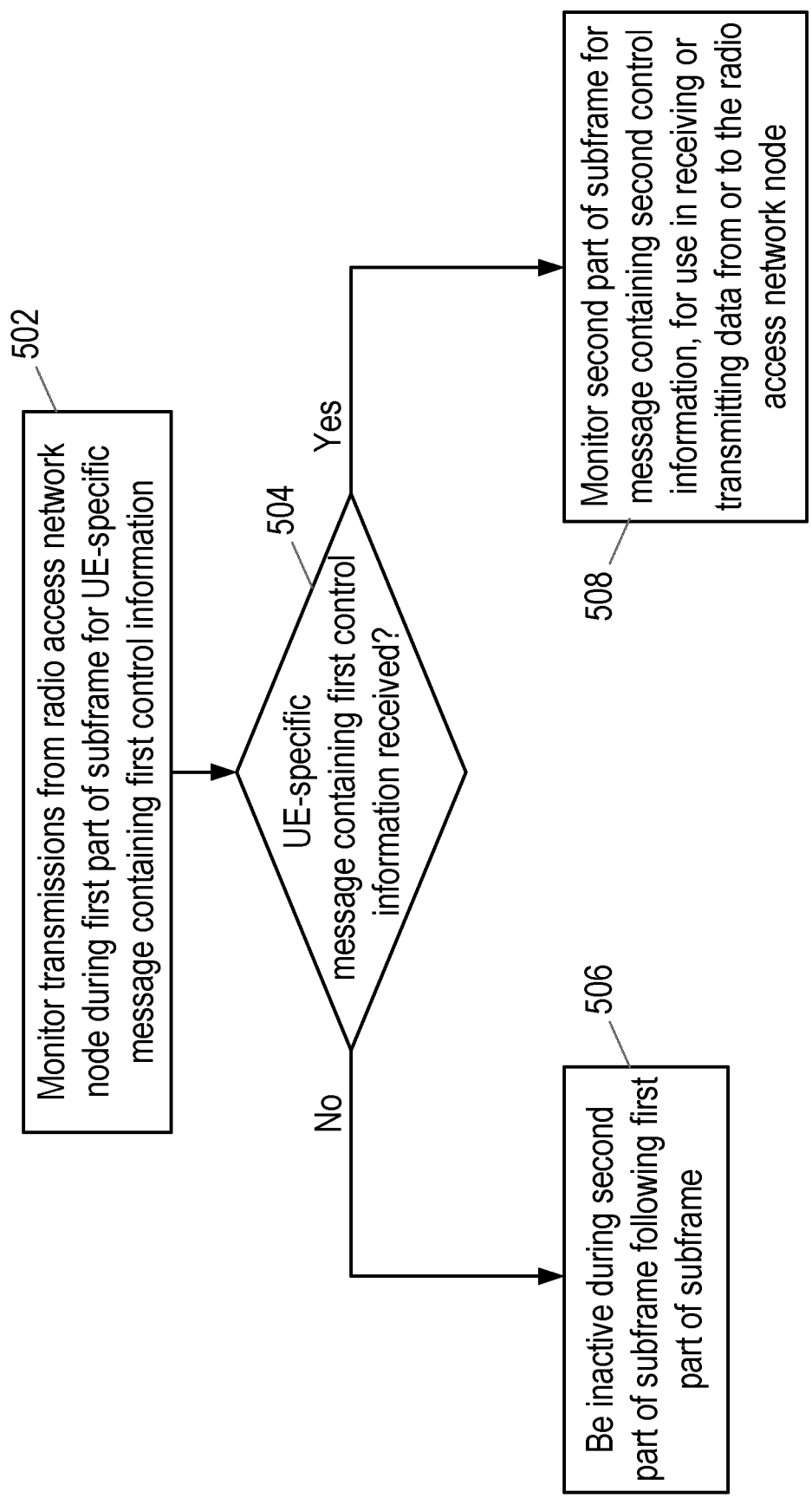
FIG. 5 illustrates a first procedure in use in the network of FIG. 1.

FIG. 5 is a flow chart, illustrating a method performed by a user equipment device, UE, when operating with a short Transmission Time Interval (sTTI), and when using connected mode discontinuous reception, DRX. In step 502, the UE monitors transmissions from a radio access network node during a first part of a subframe for a UE-specific message for the UE containing first control information. In step 504, the UE determines whether any such UE-specific message UE containing first control information is received. If not, the method passes to step 506, in which the UE is inactive during a second part of the subframe following after the first part of the subframe. If in step 504 the UE determines that it has received the UE-specific message containing first control information, the process passes to step 508, in which the UE monitors the second part of the subframe for a message containing second control information, for use in receiving or transmitting data from or to the radio access network node.

Figure 6:
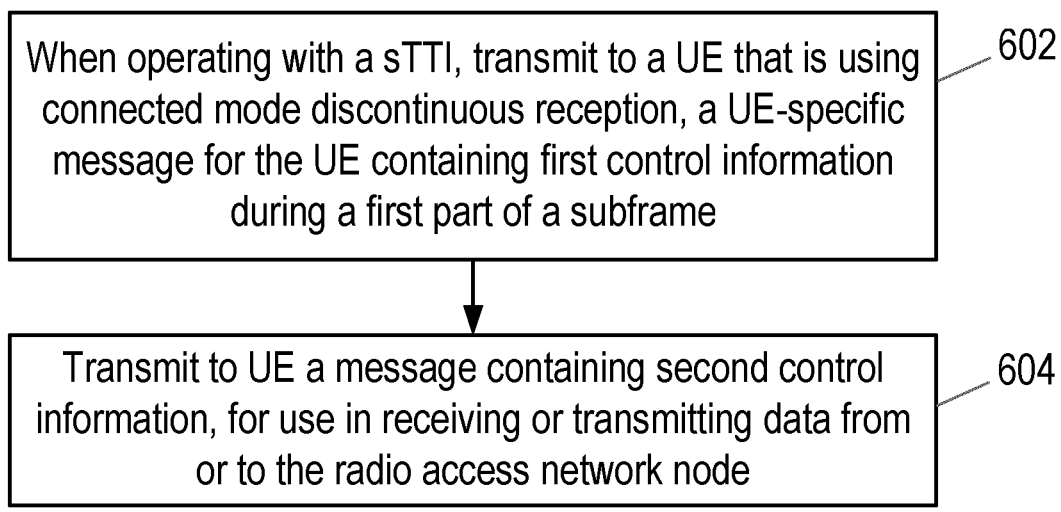
FIG. 6 illustrates a second procedure in use in the network of FIG. 1.

FIG. 6 is a flow chart, illustrating a method performed by a radio access network node. At step 602, when operating with a short Transmission Time Interval (sTTI), the method comprises transmitting to a user equipment device, UE, that is using connected mode discontinuous reception, a UE-specific message for the UE containing first control information during a first part of a subframe. The process passes to step 604, in which the radio access network node transmits to said UE a message containing second control information, for use in receiving or transmitting data from or to the radio access network node. Thus, the network node is configured to wake the UE from DRX by transmitting a UE specific grant message, e.g. in the sTTI, so that the UE can monitor a further (second) control information transmitted later in the same subframe by the network node.

Figure 7:
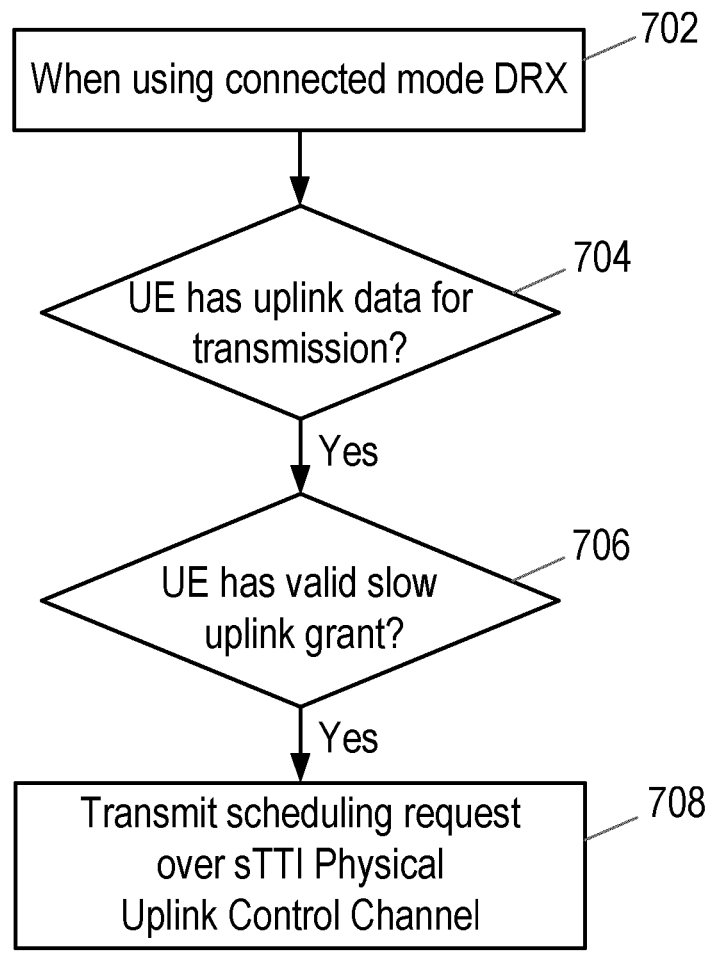
FIG. 7 illustrates a third procedure in use in the network of FIG. 1.

FIG. 7 is a flow chart, illustrating a method performed by a user equipment device, UE, with a short transmission time interval, sTTI. At step 702, the UE is using connected mode discontinuous reception, DRX. At step 704, the UE determines if it has uplink data for transmission. If so, the process passes to step 706, in which the UE determines whether it has a valid slow uplink grant. If the UE has a valid slow uplink grant, the process passes to step 708, in which the UE transmits a scheduling request over a sTTI Physical Uplink Control Channel.

Figure 8:
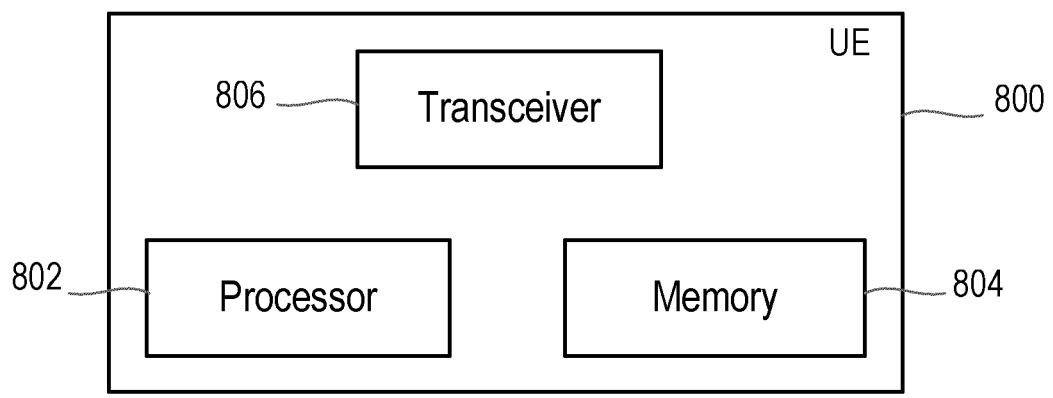
FIG. 8 illustrates a terminal device in the network of FIG. 1.

FIG. 8 illustrates a terminal device (UE) 800 that can be adapted or configured to operate according to one or more of the non-limiting example embodiments described. The UE 800 comprises a processor or processing unit 802 that controls the operation of the UE 800. The UE 800 also comprises a memory or memory unit 804 that is connected to the processing unit 802 and that contains instructions or computer code executable by the processing unit 802 and other information or data required for the operation of the UE 800 in accordance with the methods described herein. As shown, the wireless terminal device, UE, may also include a transceiver circuit 806 (also referred to as a transceiver) including a transmitter and a receiver configured to provide radio communications with at least one node of a radio access network. In some aspects, the transceiver is configured to provide radio communication with a radio access network over a radio interface. The processing unit is coupled with the transceiver, wherein the processor is configured to carry out a method according to any example.

Figure 9:
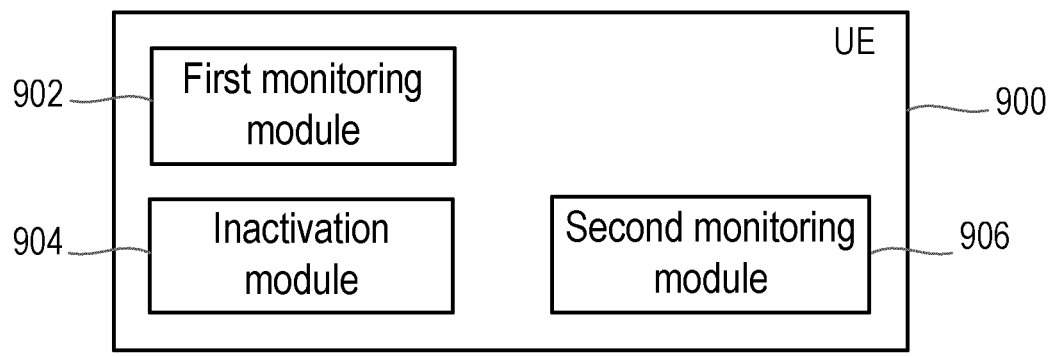
FIG. 9 illustrates a terminal device in the network of FIG. 1.
Figure 10:
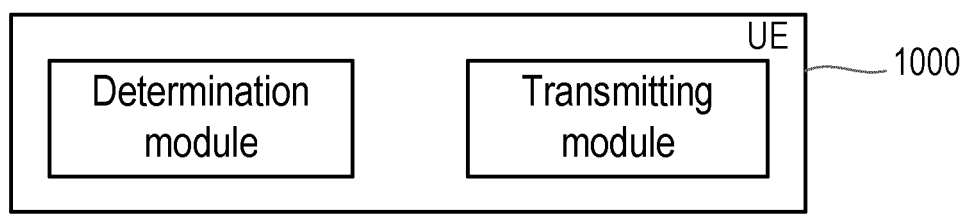
FIG. 10 illustrates a terminal device in the network of FIG. 1.

FIGS. 9 and 10 illustrate functional units in embodiments of a terminal device (UE) which may execute any of the methods described herein, for example according to computer readable instructions received from a computer program. It will be understood that the modules illustrated in FIGS. 9 and 10 may be software implemented functional units, realised in any appropriate combination of software modules, or may be hardware implemented functional units, realised in any appropriate combination of hardware units, or any combination thereof.

FIG. 9 illustrates a terminal device (UE) 900 according to embodiments. The terminal device 900 comprises a first monitoring module 902 for, when operating with a short Transmission Time Interval (sTTI), and when using connected mode discontinuous reception, DRX, monitoring transmissions from a radio access network node during a first part of a subframe for a UE-specific message for the UE containing first control information. The first monitoring module 902 may determine if a UE specific grant message is received, and accordingly whether to instruct the UE to enter a DRX sleep state or actively monitor a remainder of the subframe to search for a fast grant. The UE comprises an inactivation module 904 configured to, if no UE-specific message for the UE containing first control information is received, causing the UE to be inactive or in a sleep state during a second part of the subframe following after the first part of the subframe. The UE further comprises a second monitoring module 906 configured to, if the UE receives the UE-specific message containing first control information, monitor the second part of the subframe for a message containing second control information, for use in receiving or transmitting data from or to the radio access network node. The first monitoring module 902 and second monitoring module 906 may be partially or wholly combined.

Any described module may be considered as a functional module, and does not imply a separate software or hardware. Any module may be implemented using software and/or hardware components.

FIG. 10 illustrates a terminal device (UE) 1000 according to embodiments. The terminal device 1000 is configured to use a short transmission time interval, sTTI, and comprises a determination module 1002 for, when using connected mode discontinuous reception, DRX, and when having uplink data for transmission, determining whether the UE has a valid slow uplink grant. The UE further comprises a transmitting module 1004 for, if the UE has a valid slow uplink grant, transmitting a scheduling request over a sTTI Physical Uplink Control Channel.

Figure 11:
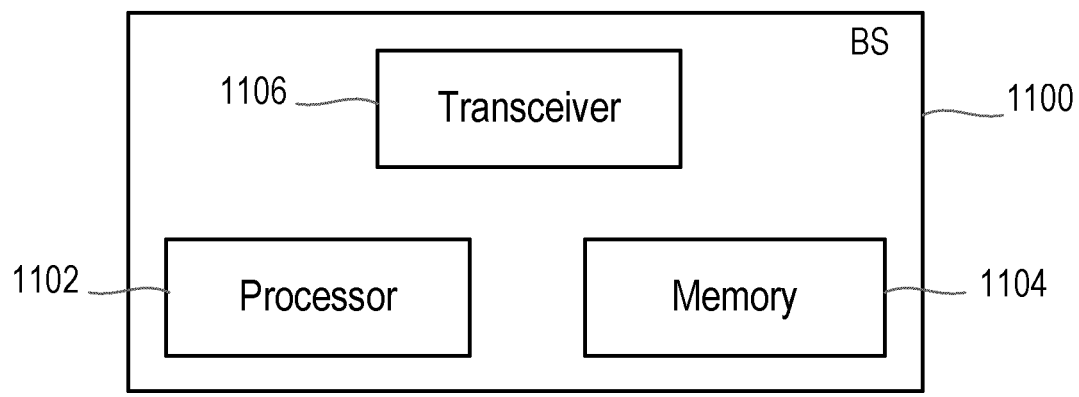
FIG. 11 illustrates a radio access node in the network of FIG. 1.

FIG. 11 illustrates a radio access network node, for example in the form of a base station, BS, or part of a base station, which may more specifically be in the form of an eNodeB (eNB) 1100 that can be adapted or configured to operate according to one or more of the non-limiting example embodiments described. The radio access network node 1100 comprises a processor or processing unit 1102 that controls the operation of the radio access network node 1100. The radio access network node 1100 also comprises a memory or memory unit 1104 that is connected to the processing unit 1102 and that contains instructions or computer code executable by the processing unit 1102 and other information or data required for the operation of the radio access network node 1100 in accordance with the methods described herein. As shown, the radio access network node may also include a transceiver circuit 1106 (also referred to as a transceiver) including a transmitter and a receiver configured to provide radio communications with at least one wireless terminal or user equipment device.

Figure 12:
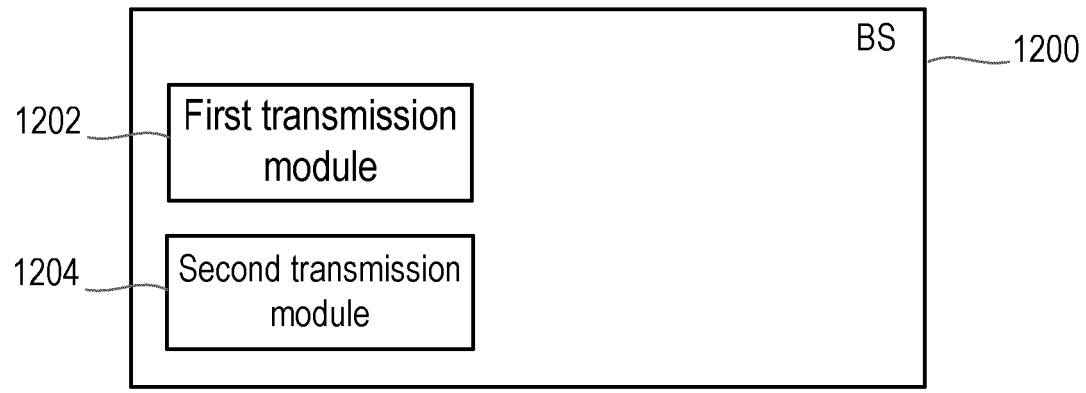
FIG. 12 illustrates a radio access node in the network of FIG. 1.

FIG. 12 illustrates functional units in embodiments of a radio access network node which may execute any of the methods described herein, for example according to computer readable instructions received from a computer program. It will be understood that the modules illustrated in FIG. 12 may be software implemented functional units, realised in any appropriate combination of software modules, or may be hardware implemented functional units, realised in any appropriate combination of hardware units, or any combination thereof.

FIG. 12 illustrates a radio access network node 1200 for example in the form of a base station, BS, which may more specifically be in the form of an eNodeB (eNB) according to embodiments. The radio access network node 1200 comprises a first transmission module 1202 configured, when operating with a short Transmission Time Interval (sTTI), to transmit to a user equipment device, UE, that is using connected mode discontinuous reception, a UE-specific message for the UE containing first control information during a first part of a subframe; and a second transmission module 1204 configured to transmit to said UE a message containing second control information, for use in receiving or transmitting data from or to the radio access network node. The first transmission module 1202 and second transmission module 1204 may be partially or wholly combined.

Examples of the disclosure relate to DCI (Downlink Control Information) for uplink and downlink transmissions with short TTIs. The scheduling mechanism for PUSCH and PDSCH with shortened TTI are described, in order to be able to leverage the benefit of reduced (short) TTI as compared to the legacy TTI of 1 ms.

Since scheduling and control information is transmitted more often when using short TTIs, it is useful to limit the amount of information transmitted on the fast time scale to keep the overhead at a reasonable level. Therefore, part of the control information is transmitted on a slower timescale (slow grant). Although this slow grant can be directed to a group of sTTI UEs, directing the slow grant to a specific UE provides the UE to either immediately return to a DRX sleep state if no UE-specific slow grant for the UE is received, or continue to monitor the remainder of the subframe for a fast grant (e.g. by exiting DRX mode or extending an active state). The disclosure corresponds to two types of DCIs for sTTI transmission; the slow DCI and the UE specific fast DCI. For the addressing of slow DCI, a sTTI UE specific RNTI is used. The slow DCI can be sent in PDCCH, while the fast DCI may be sent inband on the short TTI timescale. Thus, to limit control overhead, the sTTI control and scheduling information should be divided onto a fast and a slow DCI type. The slow DCI is UE specific and addressed with a UE specific (e.g. C-RNTI) in PDCCH. The fast DCI is also UE specific, and sent inband on the short TTI timescale.

An example connection between UL and DL sTTI bands is now described. Since the fast grants for the UL sTTI band are transmitted inband in the DL sTTI band, the UE is required to have access to both bands. If a HARQ feedback channel (sPUCCH) for sPDSCH is defined as part of the UL sTTI band, this also requires a connection between one DL and one UL sTTI band. But if sPUCCH is defined independently of the UL sTTI band no such connection is required. Thus, in some examples, the UE needs access to both a DL and an UL sTTI band for full sTTI operation.

In some examples, the UEs will in most cases have different needs in terms of latency and amount of DL data with shortened TTI, which can affect the trade-off between latency and throughput. By allowing flexibility in the number of data symbols of the TTI of sPDSCH, an adaptation can be done of the length of the TTI for each sPDSCH with short TTI to the amount of payload that needs to be transmitted. Further, the flexibility allows to dynamically control the trade-off between overhead and latency reduction for receiving HARQ and thereafter TCP ACKs.

In some examples, the UEs will in most cases have different amount of data in their buffers when transmitting in uplink. By allowing flexibility in the number of data symbols between legacy TTI of 14 SC-FDMA symbols and at least one sPUSCH format of 2 to 7 SC-FDMA symbols, an adaptation can be done for both latency requirements and amount of data in buffers. Thus, for improved flexibility the TTI length can be configurable for each short TTI.

The slow grant is directed to a specific UE, but is sent in the common search space in PDCCH. The fast grants are directed to any of the UEs in the group that received the slow grant. Therefore, the fast grant should also be placed in a search space common for this group of UEs. The fast DCI should carry scheduling information on the short TTI timescale. This is preferably done by embedding the fast DCI in the short TTI. To allow for low latency the fast DCI should be placed as early as possible in the short TTI, and also have short duration. Allowing for multiple UEs per short TTI in UL and DL will require multiple fast DCI messages sent inside one short TTI. In some examples, multiple fast DCI can be sent in the first symbol of every short TTI.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluèRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

For purposes of illustration only, these embodiments of the disclosure are described in the context of operating in a RAN (Radio Access Network) that communicates over radio communication channels with wireless terminals (also referred to as UEs, user equipments, user equipment nodes, mobile terminals, wireless devices, etc.). The disclosure is not limited to such embodiments and may be embodied generally in any type of communication network. As used herein, a legacy or non-legacy wireless terminal (also referred to as a UE, user equipment, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including 5G, 5G-NX. LTE-NX, WCDMA, WiMax, UMB and GSM, may also benefit from the features of this disclosure.

Also, note that terminology such as eNodeB (also referred to as a base station, eNB, etc.) and UE (also referred to as user equipment, user equipment node, wireless terminal, mobile terminal, wireless device, etc.) should be considering non-limiting.

Certain example embodiments are defined in the following statements.

Statement A1. A method of operation of a user equipment device, UE, comprising:
when operating with a short Transmission Time Interval (sTTI), and when using connected mode discontinuous reception, DRX, monitoring a Physical Downlink Control Channel, PDCCH. for a UE-specific grant message from a radio access network node.

Statement A2. A method according to statement A1, comprising, if no UE-specific grant message is received, remaining inactive during a part of the subframe following the PDCCH.

Statement A3. A method according to statement A1 or A2, wherein the UE-specific grant message is a slow grant message.

Statement A4. A method according to statement A3, further comprising, if the UE receives the UE-specific slow grant message, exiting a connected mode discontinuous reception, DRX, mode and searching for a fast grant message.

Statement A5. A method according to statement A4, comprising searching for the fast grant message in a downlink sTTI band defined by the UE-specific slow grant message.

Statement A6. A method according to statement A1, wherein the UE-specific grant message is a fast grant.

Statement A7. A method according to statement A6, further comprising, on receiving the UE-specific fast grant message, reading a slow grant message.

Statement A8. A method according to statement A7, wherein the slow grant message is a non-UE-specific slow grant message in the PDCCH.

Statement A9. A method according to statement A1, wherein the UE-specific grant message is an extended fast grant fully identifying a resource allocation.

Statement A10. A method according to one of statements A1-A9, wherein at least a part of the UE-specific grant message is scrambled with a Cell-Radio Network Temporary Identifier, C-RNTI.

Statement A11. A method according to statement A10, wherein a Cyclic Redundancy Check, CRC, in the UE-specific grant message is scrambled with the Cell-Radio Network Temporary Identifier, C-RNTI.

Statement A12. A method according to statement A1 or A2, comprising, if a UE-specific grant message is received, exiting the connected mode DRX mode.

Statement A13. A method according to any one of statements A1-A12, comprising, if the UE determines that it has data to transmit, exiting the connected mode DRX mode.

Statement A14. A method according to statement A13, further comprising searching for a fast grant message in a downlink sTTI band.

Statement A15. A method according to statement A13 or A14, further comprising:
 determining whether the UE has a valid slow uplink grant; and
 if the UE does not have a valid slow uplink grant, transmitting a scheduling request over a Physical Uplink Control Channel; or
 if the UE has a valid slow uplink grant, transmitting a scheduling request over a sTTI Physical Uplink Control Channel.

Statement A16. A user equipment device, configured to perform a method according to any one of statements A1-A15.

Statement A17. A computer program product, comprising computer readable code for causing a programmed processor to perform a method according to any one of statements A1-A15.

Statement B1. A method of operation of a radio access network node, the method comprising:
 initiating transmission to a user equipment device, UE, that is using connected mode discontinuous reception, DRX, of a UE-specific grant message to the UE during a Physical Downlink Control Channel, PDCCH.

Statement B2. A method according to statement B1, performed when operating with a short Transmission Time Interval (sTTI).

Statement B3. A method according to statement B1 or B2, performed following a determination to wake up the UE.

Statement B4. A method according to any of statements B1, B2 or B3, wherein the UE-specific grant message is a slow grant.

Statement B5. A method according to statement B4, further comprising initiating transmission of a UE-specific fast grant message.

Statement B6. A method according to statement B5, further comprising initiating transmission of the fast grant message in a downlink sTTI band.

Statement B7. A method according to any of statements B1, B2 or B3, wherein the UE-specific grant message is a fast grant.

Statement B8. A method according to any of statements B1, B2 or B3, wherein the UE-specific grant message is an extended fast grant fully identifying a resource allocation.

Statement B9. A method according to one of statements B1-B8, wherein the UE-specific grant message is scrambled with a Cell-Radio Network Temporary Identifier, C-RNTI of the UE.

Statement B10. A method according to one of statements B1-B9, performed when using a short transmission time interval, sTTI.

Statement B11. A radio access network node, configured to perform a method according to any one of statements B1-B10.

Statement B12. A computer program product, comprising computer readable code for causing a programmed processor to perform a method according to any one of statements B1-B11.

Statement C1. A method of operation of a user equipment device, UE, with a short transmission time interval, sTTI, comprising:
 when using connected mode discontinuous reception, DRX, and when having uplink data for transmission:
 determining whether the UE has a valid slow uplink grant; and
 if the UE has a valid slow uplink grant, transmitting a scheduling request over a sTTI Physical Uplink Control Channel.

Statement C2. A method according to C1, further comprising:
 if the UE does not have a valid slow uplink grant, transmitting a scheduling request over a Physical Uplink Control Channel.

Statement C3. A method according to C1, further comprising:
 if the UE does not have a valid slow uplink grant, transmitting a scheduling request over the sTTI Physical Uplink Control Channel in a subsequent subframe.

Statement C4. A method according to C1, further comprising:
 if the UE does not have a valid slow uplink grant, transmitting a scheduling request over a Physical Uplink Control Channel, and then transmitting the scheduling request over the sTTI Physical Uplink Control Channel in a subsequent subframe.

Statement D1. A method of operation of a UE in Connected DRX mode, comprising:
 sleeping and waking up to monitor PDCCH in a predefined set of subframes;
 if a grant is not found, sleeping immediately after the PDCCH;
 if the UE reads a slow DL grant with a UE specific address, waking from DRX and searching for fast grants for the duration of the subframe.

Further example embodiments are defined below:

Embodiment 1. A method of operation of a user equipment device, UE, comprising:
 when operating with a short Transmission Time Interval (sTTI), and when using connected mode discontinuous reception, DRX, monitoring transmissions from a radio access network node during a first part of a subframe for a UE-specific message for the UE containing first control information;
 if no UE-specific message for the UE containing first control information is received, being inactive during a second part of the subframe following after the first part of the subframe; and
 if the UE receives the UE-specific message containing first control information:
 monitoring the second part of the subframe for a message containing second control information, for use in receiving or transmitting data from or to the radio access network node.

Embodiment 2. A method as defined in embodiment 1, wherein the first control information defines a frequency resource available for data communication with the radio access network node over a subframe.

Embodiment 3. A method as defined in embodiment 1, wherein the message containing first control information comprises a slow grant message or slow downlink control information, DCI, message.

Embodiment 4. A method as defined in embodiment 1, 2 or 3, wherein the second control information defines a time resource for a sub-subframe of the subframe.

Embodiment 5. A method as defined in embodiment 1, wherein the message containing second control information comprises a fast grant message or fast DCI message.

Embodiment 6. A method as defined in one of embodiments 1 to 5, further comprising, in response to receiving the UE-specific message containing first control information, exiting connected mode DRX.

Embodiment 7. A method as defined in one of embodiments 1 to 6, wherein the first part of the subframe comprises a subset of symbol periods in the subframe.

Embodiment 8. A method as defined in one of embodiments 1 to 7, wherein the first part of the subframe comprises a Physical Downlink Control Channel, PDCCH.

Embodiment 9. A method as defined in embodiment 8, wherein the second part of the subframe comprises a downlink sTTI band, which is defined in the first control information.

Embodiment 10. A method as defined in embodiment 9, wherein the downlink sTTI band comprises a subset of available subcarriers during symbols subsequent to the PDCCH.

Embodiment 11. A method according to one of embodiments 1 to 10, wherein at least a part of the UE-specific message containing first control information is scrambled with a Cell-Radio Network Temporary Identifier, C-RNTI.

Embodiment 12. A method according to embodiment 11, wherein a Cyclic Redundancy Check, CRC, of the UE-specific message containing first control information is scrambled with the Cell-Radio Network Temporary Identifier, C-RNTI.

Embodiment 13. A method according to any one of embodiments 1 to 12, comprising, if the UE determines that it has data to transmit, exiting the connected mode DRX mode.

Embodiment 14. A user equipment device, configured to perform a method according to any one of embodiments 1 to 13.

Embodiment 15. A computer program product, comprising computer-readable code, configured to cause a suitably programmed processor to perform a method according to any one of embodiments 1 to 13.

Embodiment 16. A method of operation of a radio access network node, the method comprising:
when operating with a short Transmission Time Interval (sTTI), transmitting to a user equipment device, UE, that is using connected mode discontinuous reception, a UE-specific message for the UE containing first control information during a first part of a subframe; and
transmitting to said UE a message containing second control information, for use in receiving or transmitting data from or to the radio access network node.

Embodiment 17. A method according to embodiment 16, further comprising transmitting the UE-specific message containing first control information only if the radio access network node also has second control information to transmit to said UE.

Embodiment 18. A method as defined in embodiment 16, wherein the first control information defines a frequency resource available for data communication with the radio access network node over a subframe.

Embodiment 19. A method as defined in embodiment 16, wherein the message containing first control information comprises a slow grant message or slow downlink control information, DCI, message.

Embodiment 20. A method as defined in embodiment 16, 17, 18 or 19, wherein the second control information defines a time resource for a sub-subframe of the subframe.

Embodiment 21. A method as defined in embodiment 16, 17, 18 or 19, wherein the message containing second control information comprises a fast grant message or fast DCI message.

Embodiment 22. A method as defined in one of embodiments 16 to 21, wherein the first part of the subframe comprises a subset of symbol periods in the subframe.

Embodiment 23. A method as defined in one of embodiments 16 to 22, wherein the first part of the subframe comprises a Physical Downlink Control Channel, PDCCH.

Embodiment 24. A method as defined in embodiment 23, wherein the second part of the subframe comprises a downlink sTTI band, which is defined in the first control information.

Embodiment 25. A method as defined in embodiment 24, wherein the downlink sTTI band comprises a subset of available subcarriers during symbols subsequent to the PDCCH.

Embodiment 26. A method according to one of embodiments 16 to 25, comprising scrambling at least a part of the UE-specific message containing first control information with a Cell-Radio Network Temporary Identifier, C-RNTI.

Embodiment 27. A method according to embodiment 26, comprising scrambling a Cyclic Redundancy Check, CRC, of the UE-specific message containing first control information with the Cell-Radio Network Temporary Identifier, C-RNTI.

Embodiment 28. A radio access network node, configured to perform a method according to any one of embodiments 16 to 27 or according to any example.

Embodiment 29. A computer program product, comprising computer-readable code, configured to cause a suitably programmed processor to perform a method according to any one of embodiments 16 to 27 or according to any example.

Embodiment 30. A radio access network node of a wireless communication network, comprising:
a transceiver circuit configured to send and receive wireless signals; and
a processing circuit operatively connected to the transceiver circuit and configured to carry out a method according to any example.

Embodiment 31. A user equipment for wireless communication with a network node, the user equipment comprising:
a transceiver circuit configured to send and receive wireless signals; and
a processing circuit operatively connected to the transceiver circuit and configured to carry out a method according to any example.

Embodiment 32. A terminal device (UE) configured to wirelessly communicate with a network node, the terminal device comprising a first monitoring module for, when operating with a short Transmission Time Interval (sTTI), and when using connected mode discontinuous reception, DRX, monitoring transmissions from a radio access network node during a first part of a subframe for a UE-specific message for the UE containing first control information, and the terminal device (UE) further comprising an inactivation module for, if no UE-specific message for the UE containing first control information is received, causing the UE to be in a sleep state during a second part of the subframe following after the first part of the subframe, and the terminal UE further comprises a second monitoring module 906 for, if the UE receives the UE-specific message containing first control information, monitoring the second part of the subframe for a message containing second control information, for use in receiving or transmitting data from or to the radio access network node. Optionally, further functions of the modules may be as described in any example.

Embodiment 33. A terminal device (UE) configured to wirelessly communicate with a network node using a short transmission time interval, sTTI, the terminal device (UE) comprising a determination module for, when using connected mode discontinuous reception, DRX, and when having uplink data for transmission, determining whether the UE has a valid slow uplink grant. The UE further comprises a transmitting module for, if the UE has a valid slow uplink grant, transmitting a scheduling request over a sTTI Physical Uplink Control Channel.

Embodiment 34. A radio access network node comprises a first transmission module configured to, when operating with a short Transmission Time Interval (sTTI), transmit to a user equipment device, UE, that is using connected mode discontinuous reception, a UE-specific message for the UE containing first control information during a first part of a subframe; and a second transmission module configured to transmit to said UE a message containing second control information, for use in receiving or transmitting data from or to the radio access network node. Optionally, further functions of the modules may be as described in any example.

Embodiment 35. A non-transitory computer readable storage medium storing a computer program, the computer program comprising program instructions that, when executed on a processing circuit of a radio access network node, cause the processing circuit to carry out the method of any example.

Embodiment 36. A computer program product, comprising instructions which, when executed on at least one processing circuit, cause the at least one processing circuit to carry out the method according to any example.

Embodiment 37. A carrier containing the computer program product of any example, wherein the carrier is one of an electronic signal, optical signal, radio signal, or computer readable storage medium.

It should be noted that all of the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope. Any example of the disclosure may be used with any other example, in any combination.

The invention claimed is:

1. A method of operating of a user equipment device (UE), the method comprising:
when operating with a short Transmission Time Interval (sTTI) and when using connected mode discontinuous reception (DRX), monitoring transmissions from a radio access network node during a first part of a subframe for a UE-specific message for the UE containing first control information;
if no UE-specific message for the UE containing first control information is received, being inactive during a second part of the subframe following after the first part of the subframe; and
if the UE receives the UE-specific message containing first control information, monitoring the second part of the subframe for a message containing second control information, for use in receiving or transmitting data from or to the radio access network node.

2. The method of claim 1, wherein the first control information defines a frequency resource available for data communication with the radio access network node over a subframe.

3. The method of claim 1, wherein the message containing first control information comprises a slow grant message or slow downlink control information (DCI) message.

4. The method of claim 1, wherein the second control information defines a time resource for a sub-subframe of the subframe.

5. The method of claim 1, wherein the message containing second control information comprises a fast grant message or fast downlink control information (DCI) message.

6. The method of claim 1, wherein the first part of the subframe comprises a Physical Downlink Control Channel (PDCCH).

7. The method of claim 1, wherein the second part of the subframe comprises a downlink sTTI band, which is defined in the first control information.

8. The method of claim 7, wherein the downlink sTTI band comprises a subset of available subcarriers during symbols subsequent to a PDCCH.

9. A user equipment (UE) for wireless communication with a radio access network node, the user equipment comprising:
a transceiver circuit configured to send and receive wireless signals; and
processing circuitry operatively connected to the transceiver circuit and configured to:
when operating with a short Transmission Time Interval (sTTI) and when using connected mode discontinuous reception (DRX), monitor transmissions from a radio access network node during a first part of a subframe for a UE-specific message for the UE containing first control information;
if no UE-specific message for the UE containing first control information is received, be inactive during a second part of the subframe following after the first part of the subframe; and
if the UE receives the UE-specific message containing first control information, monitor the second part of the subframe for a message containing second control information, for use in receiving or transmitting data from or to the radio access network node.

10. The user equipment of claim 9:
wherein the first control information defines a frequency resource available for data communication with the radio access network node over a subframe; and/or
wherein the second control information defines a time resource for a sub-subframe of the subframe.

11. The user equipment of claim 9:
wherein the message containing first control information comprises a slow grant message or slow downlink control information (DCI) message; and/or
wherein the message containing second control information comprises a fast grant message or fast DCI message.

12. The user equipment of claim 9:
wherein the first part of the subframe comprises a Physical Downlink Control Channel (PDCCH); and/or
wherein the second part of the subframe comprises a downlink sTTI band, which is defined in the first control information.

13. A method of operation of a radio access network node, the method comprising:
when operating with a short Transmission Time Interval (sTTI), transmitting, to a user equipment device (UE) that is using connected mode discontinuous reception (DRX), a UE-specific message for the UE containing first control information during a first part of a subframe; and
transmitting, to the UE, a message containing second control information, for use in receiving or transmitting data from or to the radio access network node.

14. The method of claim 13, further comprising transmitting the UE-specific message containing the first control information only if the radio access network node also has the second control information to transmit to the UE.

15. The method of claim 13, wherein the first control information defines a frequency resource available for data communication with the radio access network node over a subframe.

16. The method of claim 13, wherein the message containing first control information comprises a slow grant message or slow downlink control information (DCI) message.

17. The method of claim 13, wherein the second control information defines a time resource for a sub-subframe of the subframe.

18. The method of claim 13, wherein the message containing second control information comprises a fast grant message or fast downlink control information (DCI) message.

19. The method of claim 13, wherein the first part of the subframe comprises a Physical Downlink Control Channel (PDCCH).

20. The method of claim 13:
wherein the second part of the subframe comprises a downlink sTTI band, which is defined in the first control information; and
wherein the downlink sTTI band comprises a subset of available subcarriers during symbols subsequent to the PDCCH.

21. A radio access network node, the radio access network node comprising:
a transceiver circuit configured to send and receive wireless signals; and
a processing circuitry operatively connected to the transceiver circuit and configured to carry out a method comprising:
when operating with a short Transmission Time Interval (sTTI), transmitting, to a user equipment device (UE) that is using connected mode discontinuous reception (DRX), a UE-specific message for the UE containing first control information during a first part of a subframe; and
transmitting, to the UE, a message containing second control information, for use in receiving or transmitting data from or to the radio access network node.

22. The radio access network node of claim 21:
wherein the radio access node is configured to transmit the UE-specific message containing the first control information only if the radio access network node also has the second control information to transmit to the UE.

23. The radio access network node of claim 21:
wherein the first control information defines a frequency resource available for data communication with the radio access network node over a subframe; and/or
wherein the second control information defines a time resource for a sub-subframe of the subframe.

24. The radio access network node of claim 21:
wherein the message containing first control information comprises a slow grant message or slow downlink control information (DCI) message; and/or
wherein the message containing second control information comprises a fast grant message or fast DCI message.

25. The radio access network node of claim 21:
wherein the first part of the subframe comprises a Physical Downlink Control Channel (PDCCH); and/or
wherein the second part of the subframe comprises a downlink sTTI band, which is defined in the first control information, and wherein the downlink sTTI band comprises a subset of available subcarriers during symbols subsequent to the PDCCH.

* * * * *